United States Patent
Cheston et al.

(10) Patent No.: US 7,424,745 B2
(45) Date of Patent: Sep. 9, 2008

(54) ANTI-VIRUS FIX FOR INTERMITTENTLY CONNECTED CLIENT COMPUTERS

(75) Inventors: Richard W. Cheston, Morrisville, NC (US); Daryl Carvis Cromer, Apex, NC (US); Mark Charles Davis, Durham, NC (US); Howard Jeffrey Locker, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 654 days.

(21) Appl. No.: 11/057,804

(22) Filed: Feb. 14, 2005

(65) Prior Publication Data

US 2006/0185015 A1    Aug. 17, 2006

(51) Int. Cl.
*G06F 11/30* (2006.01)
*G06F 12/14* (2006.01)
*G06F 7/04* (2006.01)
*G06F 17/30* (2006.01)
*H04L 9/32* (2006.01)
*G06K 9/00* (2006.01)
*G06F 15/177* (2006.01)
*G06F 15/16* (2006.01)
*G06F 15/18* (2006.01)
*G08B 23/00* (2006.01)

(52) U.S. Cl. .............. 726/24; 713/188; 726/2; 726/3; 726/4; 726/11; 726/14; 726/22; 726/23; 726/26; 709/221; 709/227

(58) Field of Classification Search ............ 726/22–24, 726/2, 3, 11, 14, 26; 709/221, 227
See application file for complete search history.

(56) References Cited

U.S. PATENT DOCUMENTS

| 6,873,988 | B2 * | 3/2005 | Herrmann et al. ............ 707/10 |
| 2002/0103783 | A1 * | 8/2002 | Muhlestein .................. 707/1 |
| 2002/0116542 | A1 * | 8/2002 | Tarbotton et al. ........... 709/318 |
| 2002/0120725 | A1 | 8/2002 | DaCosta et al. |

(Continued)

FOREIGN PATENT DOCUMENTS

KR      2003060629       7/2003

(Continued)

OTHER PUBLICATIONS

Congdon, et al., Remote Authentication Dial In User Service Usage Guidelines, RFC 3580, Network Working Group, Sep. 2003, 1-23.

(Continued)

*Primary Examiner*—Ayaz Sheikh
*Assistant Examiner*—Shin-Hon Chen
(74) *Attorney, Agent, or Firm*—Carlos Munoz-Bustamante; Dillon & Yudell LLP

(57) ABSTRACT

A method and system is described for a wireless client computer to be connected via an access point to a network only if the wireless client computer has executed all requisite anti-virus programs. Where necessary, a signal from the access point notifies an anti-viral program server that an anti-virus needs to be immediately downloaded to the wireless client computer. An anti-virus fix is installed on the wireless client computer, and a full session is then initiated between the wireless client computer and a wireless network via the access point.

2 Claims, 16 Drawing Sheets

U.S. PATENT DOCUMENTS

| | | |
|---|---|---|
| 2003/0023708 A1 | 1/2003 | Jung |
| 2003/0028542 A1 | 2/2003 | Muttik et al. |
| 2003/0070087 A1 | 4/2003 | Gryaznov |
| 2003/0167410 A1 | 9/2003 | Rigstad et al. |
| 2003/0172090 A1 | 9/2003 | Asunmaa et al. |
| 2003/0191730 A1 | 10/2003 | Adkins et al. |
| 2003/0208687 A1 | 11/2003 | Liang et al. |
| 2004/0034794 A1 | 2/2004 | Mayer et al. |
| 2004/0073903 A1 | 4/2004 | Melchione et al. |
| 2004/0107360 A1* | 6/2004 | Herrmann et al. ............ 713/201 |
| 2005/0144288 A1* | 6/2005 | Liao ............................ 709/227 |
| 2005/0246767 A1* | 11/2005 | Fazal et al. .................... 726/11 |
| 2005/0262570 A1* | 11/2005 | Shay ............................. 726/26 |
| 2005/0267954 A1* | 12/2005 | Lewis et al. ................. 709/221 |
| 2005/0278775 A1* | 12/2005 | Ross .............................. 726/2 |
| 2006/0010485 A1* | 1/2006 | Gorman .......................... 726/3 |
| 2006/0085850 A1* | 4/2006 | Mayfield et al. .............. 726/14 |

OTHER PUBLICATIONS

L. Blunk, et al., PPP Extensible Authentication Protocol (EAP), RFC 2284, Network Working Group, Mar. 1998, pp. 1-12.

A Comprehensive Review of 802.11 Wireless LAN Security and the Cisco Wireless Security Suite, Cisco Systems, Inc., 2002.pp. 1-39.

Cisco SAFE: Wirless LAN Security in Depth, Cisco Systems, Inc. 2003, pp. 1-75.

Palliyil et al., JP920030275, Apparatus, Methods, and Computer Programs for Identifying or Managing Vulnerabilities Within a Data Processing Network, Nov. 26, 2003.

Piazza et al., RPS920020142, Automatic Client Responses to Worm or Hacker Attacks, Jul. 18, 2003.

* cited by examiner

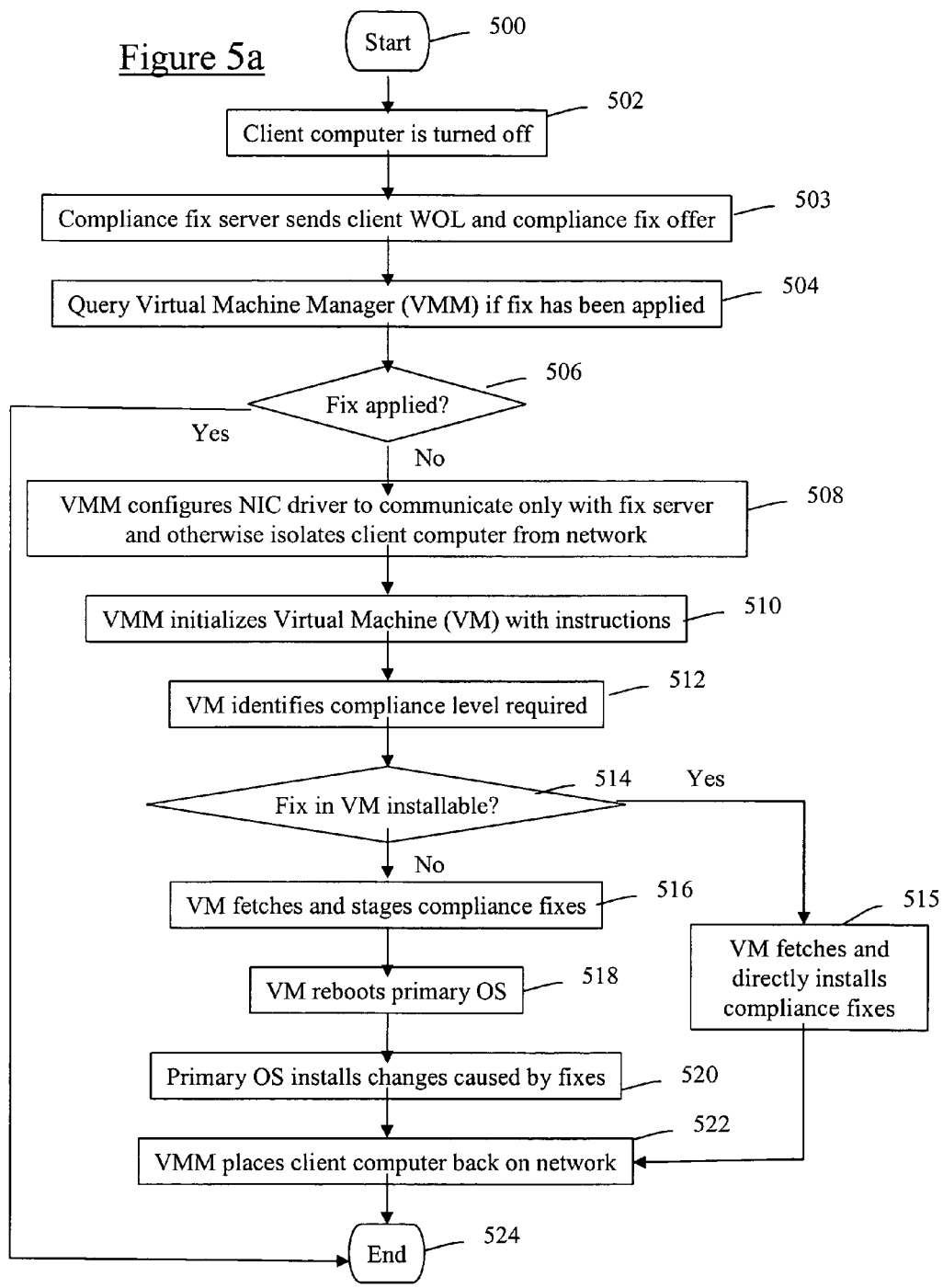

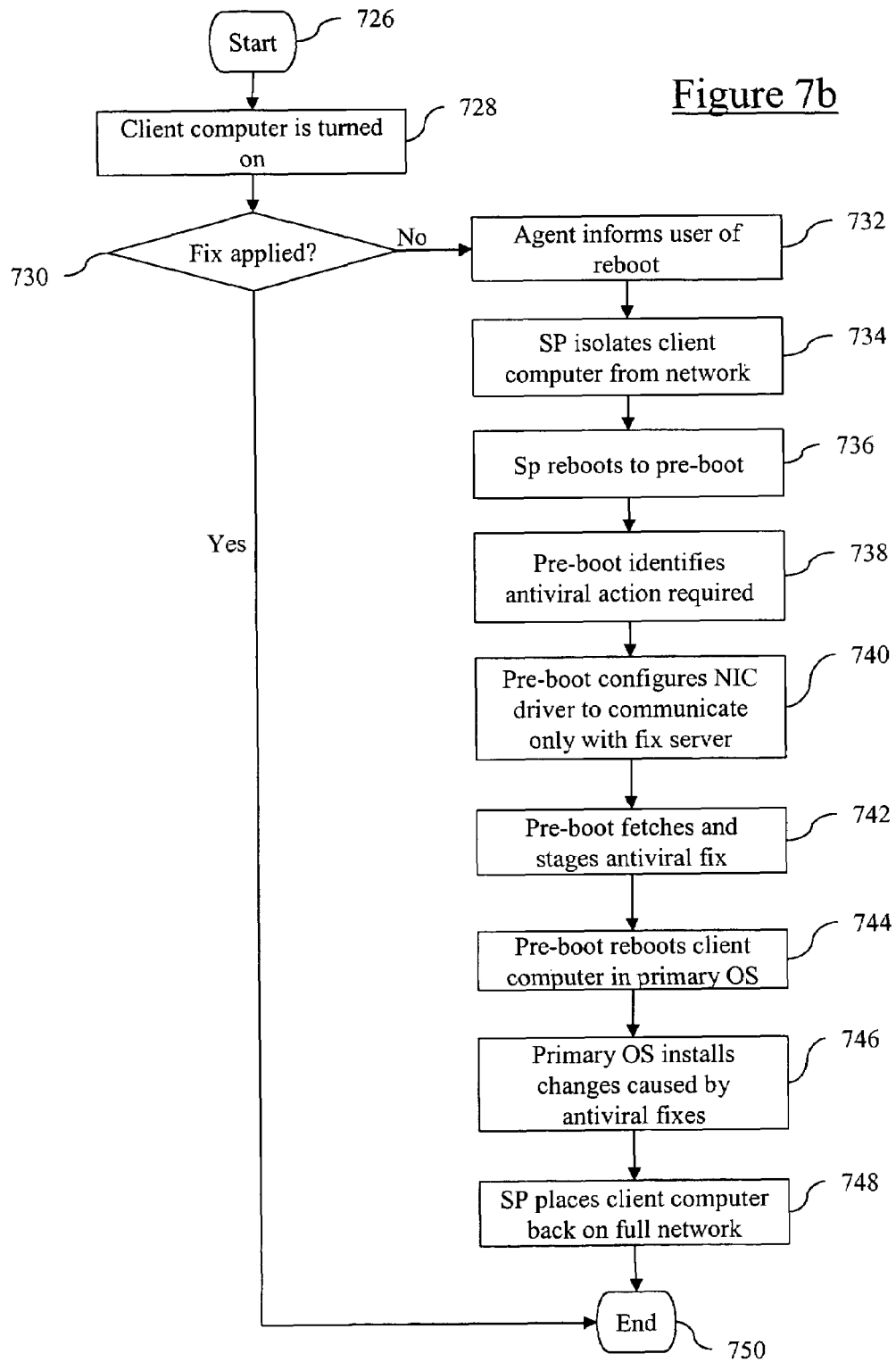

ANTI-VIRUS FIX FOR INTERMITTENTLY CONNECTED CLIENT COMPUTERS

BACKGROUND OF THE INVENTION

1. Technical Field

This invention relates generally to network computing systems that have one or more client computers. More particularly, the present invention relates to a method and system for selectively allowing a wireless computer onto a Wireless Local Area Network (WLAN) only if the wireless computer has installed and run specified anti-virus programs.

2. Description of the Related Art

While early computers were "stand alone" and unable to communicate with other computers, most computers today are able to communicate with other computers for a variety of purposes, including sharing data, e-mailing, downloading programs, coordinating operations, etc. This communication is achieved by logging onto a Local Area Network (LAN), a Wireless Local Area Network (WLAN), or a Wide Area Network (WAN). While this expanded horizon has obvious benefits, it comes at the cost of increased exposure to mischief, particularly from viruses.

A virus is programming code that, analogous to its biological counterpart, usually infects an otherwise healthy piece of code. The virus causes an undesirable event, such as causing the infected computer to work inefficiently, or else fail completely. Another insidious feature of many viruses is their ability to propagate onto other computers on the network.

The four main classes of viruses are file infectors, system (or boot-record) infectors, worms and macro viruses. A file infector attaches itself to a program file. When the program is loaded, the virus is loaded as well, allowing the virus to execute its mischief. A system infector infects a master boot record in a hard disk. Such infection will often make the hard drive inoperable upon a subsequent re-boot, making it impossible to boot-up the computer. A worm virus consumes memory or network bandwidth, thus causing a computer to be non-responsive. A macro virus is among the most common viruses, and infects word processor programs.

Another common type of virus is aimed at browers and e-mail. One such virus causes a Denial of Service (DoS) attack. A DoS virus causes a website to become unable to accept visitors. Usually, such attacks cause the buffer of the website to overflow, as a result of millions of infected computers being forced (unwittingly) to hit the website.

To counter viruses, anti-viral programs are written, and are constantly updated to be effective against new viruses. Such anti-viral programs are delivered either on physical media (such as CD-ROMs), or are downloaded off a network such as the Internet. Updates are typically downloaded as well, in order to provide rapid deployment of such updates. Such updates have problems and limitations, however. The most significant limitation is that such an update may not be downloadable if the client computer is already infected. That is, if the client computer has already been infected with a virus such as a system infector, then the computer will be completely unable to boot from its primary operating system, much less download an anti-viral program. Similarly, if the client computer is already infected with a worm virus, then the client computer will be non-responsive and unable to download the anti-viral program.

Another limitation is that the client computer is exposed to the network while downloading the anti-viral program. In the case of rapidly spreading viruses, this exposure can be critical, causing the client computer to be infected while looking for and/or downloading the necessary anti-viral program.

Another limitation is that downloading a software fix from an anti-viral program server requires user intervention or user action, such as accepting the download, selecting a drive and location to store the download, running the fix, often rebooting the computer after running the fix, et al. Many times the end user of the client computer will ignore a prompt or offer to download a fix, or will fail to manually perform an update check, thus leaving infected clients on a network, thus causing other client computers on the network to become infected.

Another limitation is that access to the network by a wireless client computer is permitted by the network's access point regardless of whether the wireless client computer has adequately installed and run the latest required version of anti-virus programs.

SUMMARY OF THE INVENTION

What is needed, therefore, is a method and system that permits a wireless client computer to receive a software fix such as an anti-viral program, even if the wireless client computer is already infected, and to have the fix automatically installed without requiring any end-user action. Preferably, such a method and system limits initial network communication to traffic that is between the wireless client computer and a pre-authorized anti-viral program server. Such a traffic limitation should be caused by allowing the wireless client computer to receive only a limited authentication from an access point, thus allowing the wireless client computer to only receive authorization to communicate with the pre-authorized anti-viral program server.

As will be seen, the foregoing invention satisfies the foregoing needs and accomplishes additional objectives. Briefly described, the present invention provides a method and system for limiting full access to a wireless access point to those wireless computers that have loaded and executed required anti-viral programs.

After determining that the wireless computer needs required anti-viral programs, the access point instructs an anti-virus (antidote) server to download the needed anti-viral programs or fixes. The anti-virus program and/or fix are installed on the wireless client computer, and a full session is then initiated between the wireless client computer and a wireless network via the access point.

Similarly, if a peer-to-peer session is requested between a first wireless computer and a second wireless computer, the two wireless computers interrogate each other to ensure that both have successfully executed any requisite anti-virus programs before initiating a peer-to-peer session.

BRIEF DESCRIPTION OF THE DRAWINGS

The novel features believed characteristic of the invention are set forth in the appended claims. The invention itself, however, as well as the preferred modes of use, further objects and advantages thereof, will best be understood by reference to the following detailed description of an illustrative embodiment when read in conjunction with the accompanying drawings, wherein:

FIG. 4b is a flow-chart of steps taken to download the anti-virus using the primary OS to reconfigure the NIC driver when the client computer is initially turned on;

FIG. 5a is a flow-chart of steps taken to download the anti-virus using a secondary OS to reconfigure the NIC driver when the client computer is initially turned off;

FIG. 5b is a flow-chart of steps taken to download the anti-virus using the secondary OS to reconfigure the NIC driver when the client computer is initially turned on;

FIG. 6b is a flow-chart of steps taken to download the anti-virus using the SP to reconfigure the NIC driver when the client computer is initially turned on;

FIG. 7b is a flow-chart of steps taken to download the anti-virus using the VM and VMM to reconfigure the NIC driver when the client computer is initially turned on;

DETAILED DESCRIPTION OF THE PREFERRED EMBODIMENT

Figure 1:
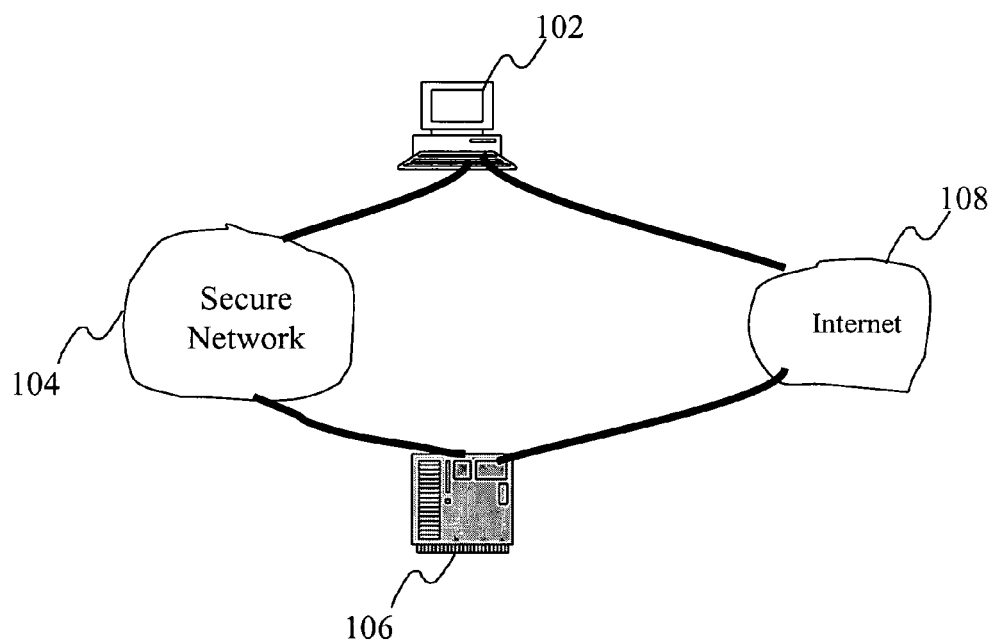
FIG. 1 depicts a schematic diagram illustrating a computer network within which the present invention may be used.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now to the drawing Figures, in which like numerals indicate like elements or steps throughout the several views, a preferred embodiment of the present invention will be described. In general, the present invention provides an improved method and system for configuring a network interface to selectively download anti-viruses from a trusted source by selectively configuring a client computer's Network Interface Card (NIC).

With reference now to FIG. 1, there is depicted an exemplary diagram of a client computer 102 coupled to a secure network 104, which is coupled to a fix server 106. In an alternate embodiment, communication between client computer 102 and fix server 106 may be via an insecure network, such as the Internet 108.

Fix server 106 is capable of delivering (downloading) software fixes, such as patches, anti-viruses, etc. For purposes of clarity and simplicity, these software fixes will usually be referred to as "anti-viruses," although it is understood to be within the scope of the present invention that any software fix used to correct a defect in software, including a virus, an outdated version, a "bug," etc., is within the scope and vision of the present invention. Additional details of client computer 102 and fix server 106 are given below.

Figure 2:
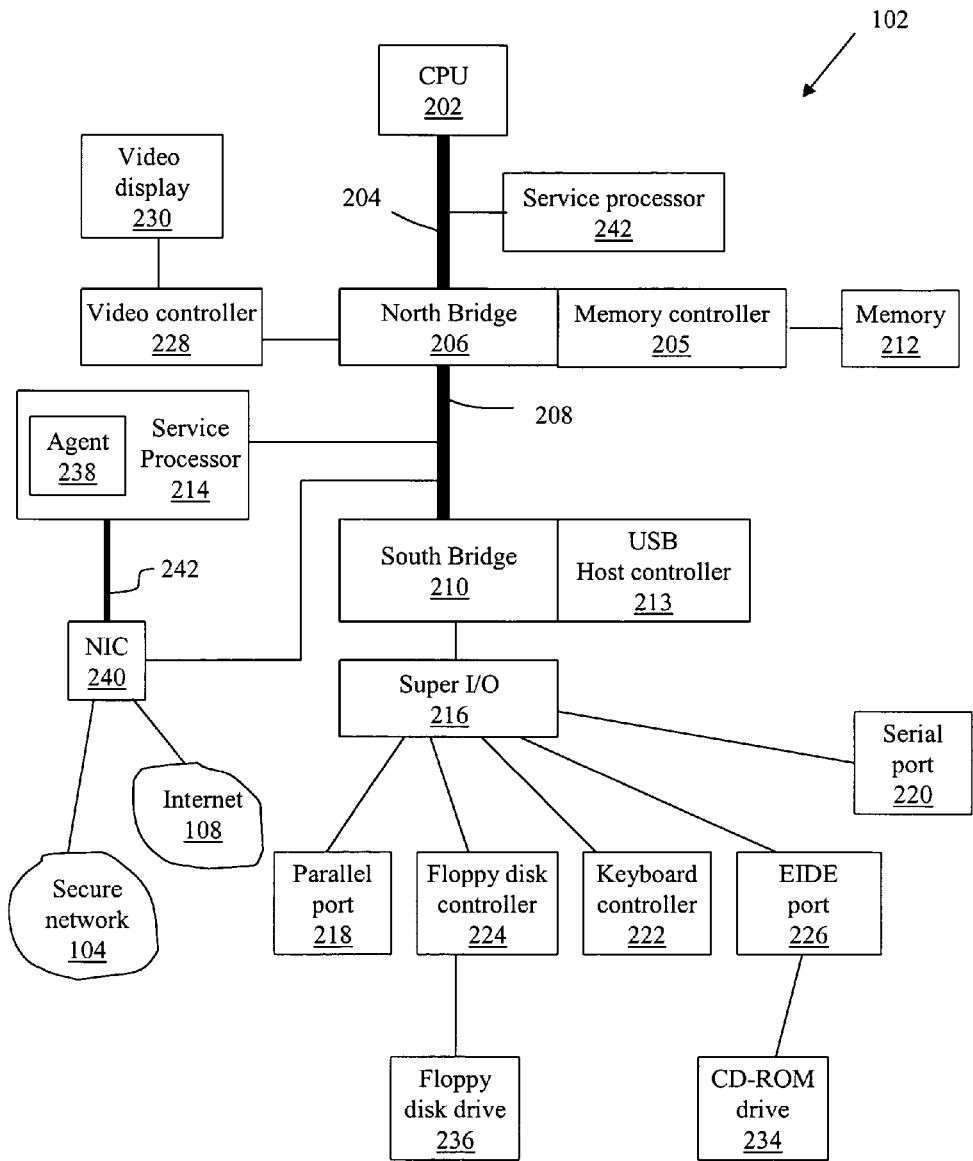
FIG. 2 illustrates an exemplary client computer that needs an anti-virus.

With reference now to FIG. 2, additional detail of client computer 102 is given. A Central Processing Unit (CPU) 202 connects via a processor interface bus 204 (also referred to in the art as a "front side bus," "host bus," or "system bus") to a North Bridge 206. North Bridge 206 is a chip or chipset arbiter logic circuit having a memory controller 207 connected to a system memory 212. A video controller 228 is coupled to North Bridge 206 and a video display 230 for viewing a graphical user interface of software operations being performed on client computer 102 by remote fix server 106. Also connected to North Bridge 206 is a high speed interconnect bus 208. North Bridge 206 is connected via interconnect bus 208, which may be a Peripheral Component Interconnect (PCI) bus, to a South Bridge 210.

South Bridge 210 is a chip or chipset Input/Output (I/O) arbiter that includes the necessary interface logic to convey signals from interconnect bus 208 to (typically slower) I/O interfaces, including a Super I/O 216. Super I/O 216 is preferably a chip or chipset including necessary logic and interfaces for a parallel port 218 and a non-USB (Universal Serial Bus) serial port 220, as are understood in the art of computer architecture. Super I/O 216 may also include controllers for non-USB devices such as a keyboard controller 222 for a non-USB keyboard and an Enhanced Integrated Device Electronics (EIDE) port 226, to which is connected to one or more Compact Disk-Read Only Memory (CD-ROM) drives 234. Also connected to Super I/O 216 is a floppy disk controller 224. Floppy disk controller 224 supports an interface with one or more floppy disk drives 236.

Coupled with South Bridge 210 is a USB host controller 213, which provides a USB interface from USB compliant devices (not shown) to client computer 102, including CPU 202. USB compliant devices may be floppy disk drives, CD-ROM drives, keyboards and other peripheral devices that are configured to comply with the "Universal Serial Bus Specification" release 2.0, Apr. 27, 2000 (USB.org), which release or later is herein incorporated by reference in its entirety. USB host controller 213, which is likewise USB compliant, may be implemented in a combination of hardware, firmware and/or software.

Communication between client computer 102 and outside networks, such as secure network 104 or non-secure Internet 108, is via a Network Interface Card (NIC) 240, which is connected to South Bridge 210 via interconnect (PCI) bus 208. Alternatively, NIC 240 is connected via a system management bus 242 to a Service Processor (SP) 214, which is connected to interconnect bus 208. SP 214 is a specialized hardware processor that can be used to configure NIC drivers for NIC 240, as described in greater detail below.

Within SP 214 is an agent 238. Agent 238 is a software program that performs a variety of tasks related to downloading anti-viruses, as described in further detail. While agent 238 is depicted as being integral with SP 214, agent 238 may alternately be stored in memory 212 or any other storage area accessible to client computer 102, particularly if client computer 102 does not have an SP 214.

Figure 3:
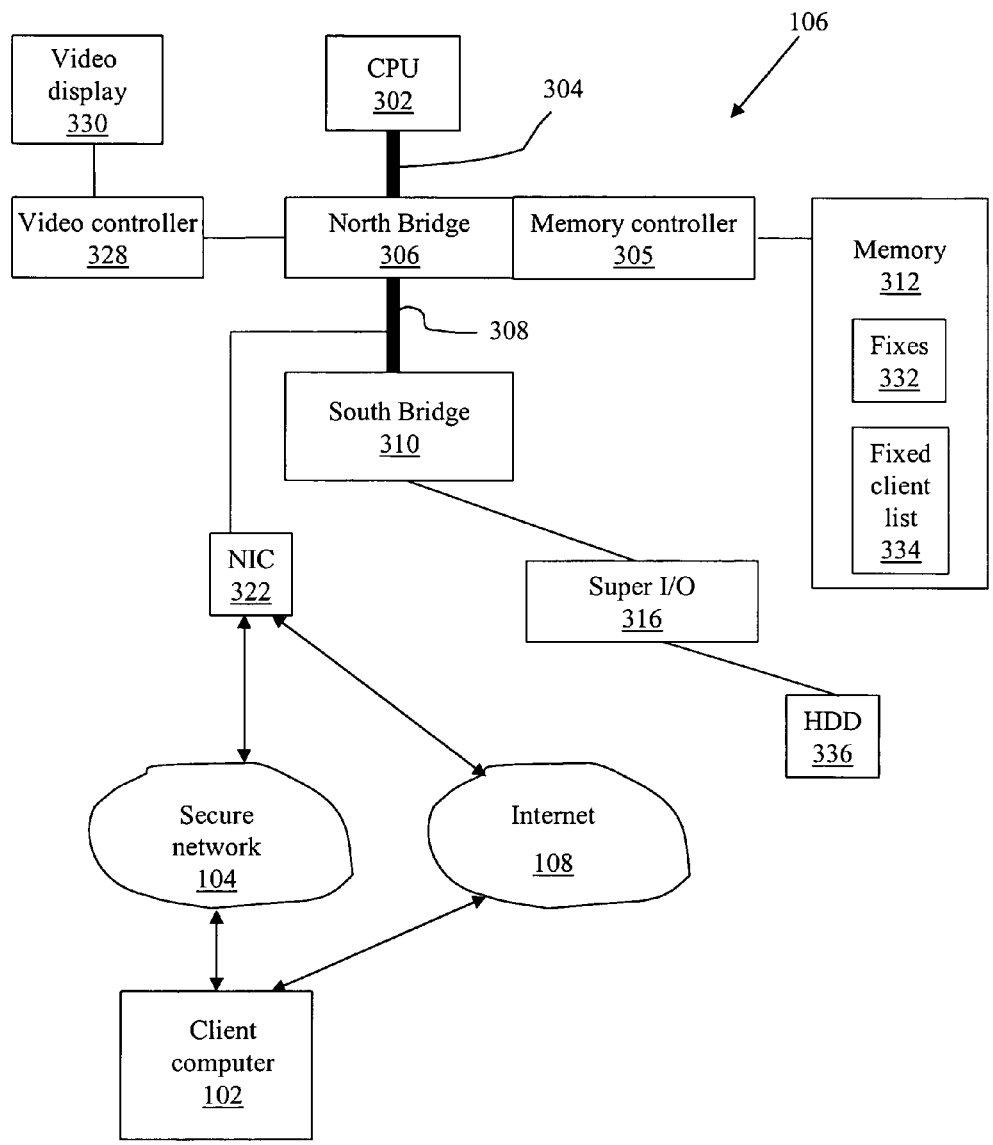
FIG. 3 depicts an exemplary fix server that supplies the anti-virus to the client computer.

With reference now to FIG. 3, there is depicted a block diagram of an exemplary fix server 106. A Central Processing Unit (CPU) 302 connects via a processor interface bus 304 (also referred to in the art as a "front side bus," "host bus," or "system bus") to a North Bridge 306. North Bridge 306 has a memory controller 307 connected to a system memory 312. Stored within system memory 312 are fixes 332, which may be any type of software fixes, including anti-virus programs, program "patches," program updates, etc. Also stored within system memory 312 is a fixed (i.e., "repaired," "updated," etc.) client list 334, which contains a listing of all client computers under fix server's 106 authority that have (or have not) received a fix stored and listed in fixes 332. Alternatively, fix server 106 may broadcast an offer to receive and execute a fix to all client computers on a network, thereby ensuring higher client coverage.

Also connected to North Bridge 306 is a high speed interconnect bus 308. Also connected to North Bridge 306 is a video controller 328, which drives a video display 330.

North Bridge 306 is connected via interconnect bus 308, which may be a Peripheral Component Interconnect (PCI) bus, to a South Bridge 310. South Bridge 310 includes the necessary interface logic to convey signals from interconnect bus 308 to a Super I/O 316. Connected to Super I/O 316 may be the types of peripherals described above with regard to Super I/O 216 in FIG. 2. Connected to interconnect bus 308 is a Network Interface Card (NIC) 322, which provides an interface, via either secure network 104 or the Internet 108, with client computer 102.

Note that the exemplary embodiments shown in FIGS. 2 and 3 are provided solely for the purposes of explaining the invention and those skilled in the art will recognize that numerous variations are possible, both in form and function. All such variations are believed to be within the spirit and scope of the present invention.

Figure 4A:
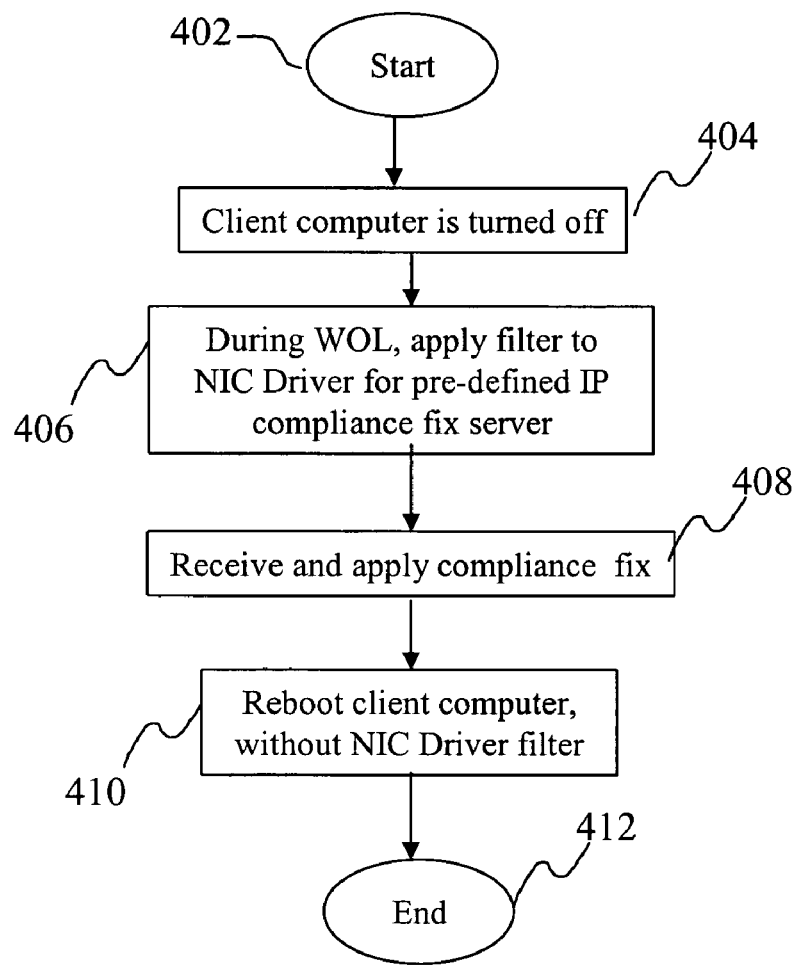
FIG. 4a is a flow-chart of steps taken to download the anti-virus using a primary operating system (OS) to reconfigure a Network Interface Card (NIC) driver, such that the NIC only communicates with the fix server, when the client computer is initially turned off.

Referring now to FIG. 4a, there is illustrated a flow-chart describing steps taken to download a fix such as an anti-virus. Proceeding from initiator step 402, a condition is assumed that the client computer is initially turned off (step 404). The fix server then wakes up the client computer, preferably using a Wake On LAN (WOL) protocol, in which a "magic packet" (message which includes sixteen sequential iterations of the client computer's Media Access Control-MAC address) received at the client computer's NIC wakes up the client computer from a reduced power state. The fix server has checked the fixed client list, and "knows" that the client computer has not received the anti-virus. Alternatively, the fix server does not care if the contacted client computer has received the fix, and simply broadcasts the offer for the fix to any client on the network. Such a broadcast preferably uses a User Datagram Protocol (UDP) formatted datagram, thus providing a checksum to verify that the fix offer has been transmitted intact.

In the preferred embodiment, during the WOL operation the magic packet includes instructions to the client computer to apply a filter to the NIC drivers allowing the NIC to communicate only with the pre-authorized fix server (step 406). The client computer then fully wakes up, and receives and applies (installs and runs) the anti-virus (step 408). The client computer is then rebooted without the NIC driver filter, allowing the client computer 410 to communicate with any other resource on the network (block 410), and the process is ended (terminator block 412).

Figure 4B:
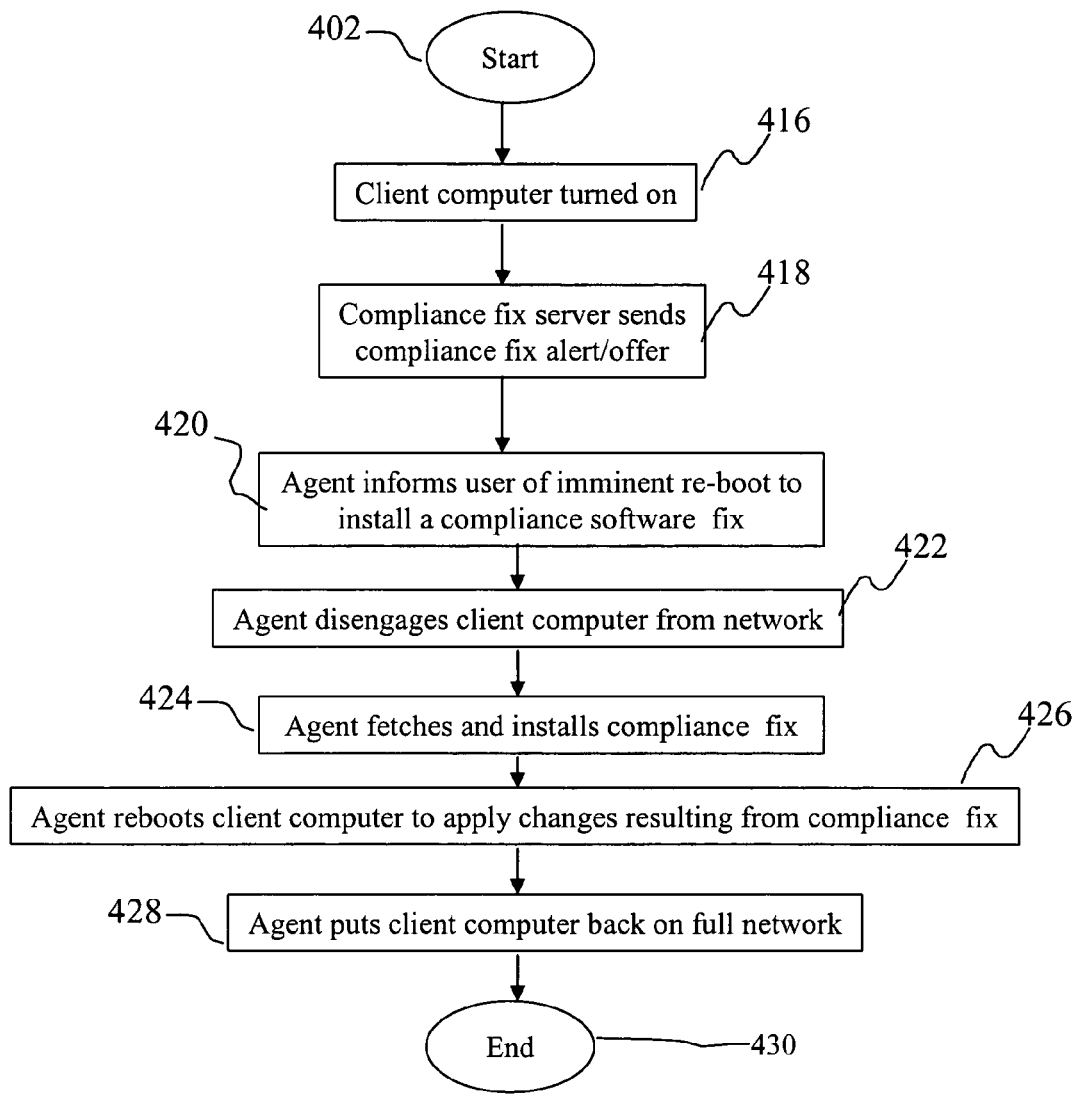

FIG. 4b depicts steps taken that are similar to those described in FIG. 4a, except that the client computer is initially turned on (blocks 414 and 416). The fix server sends an anti-virus alert to client computer (block 418). An agent stored in the client computer informs the user of the client computer that an imminent re-boot is about to occur, in order to force the downloading of an anti-virus (block 420). The agent then disengages the client computer from the network (block 422), permitting the NIC to communicate with only the fix server, as described above in FIG. 4a. The agent fetches the anti-virus (fix) from the fix computer and installs it (block 424). The agent then re-boots the client computer, applying the changes prompted by the anti-virus fix (block 426), and the client computer is put back on line with the entire network (blocks 428 and 430).

Figure 5B:
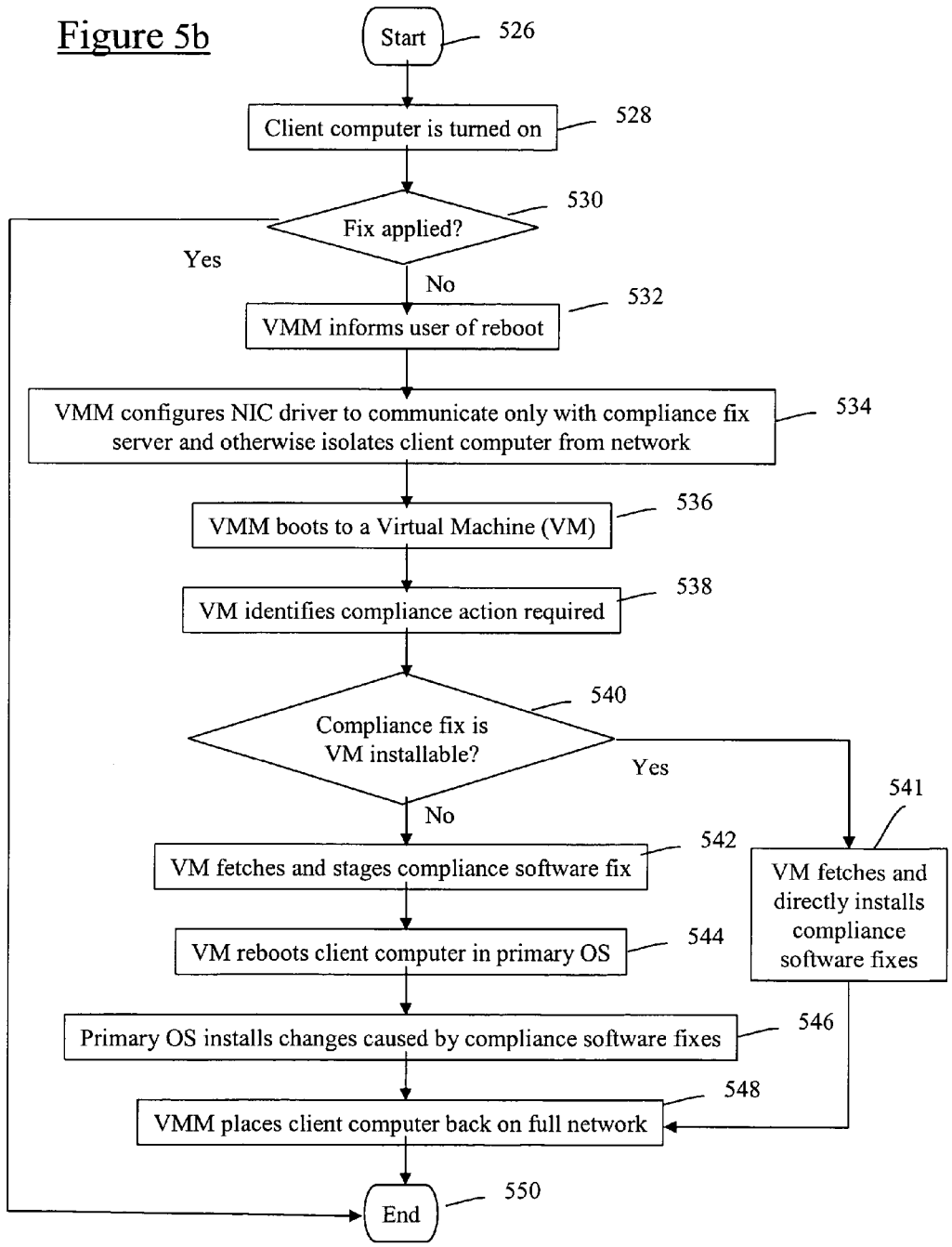

While the process described in FIGS. 4a-b is usually be effective, there may be occasions in which the primary OS has been corrupted to the point of being inoperable or non-responsive. The method depicted in FIGS. 5a-b address this situation. Referring now to FIG. 5a, assume first that the client computer is initially turned off (blocks 500 and 502). The fix computer sends a Wake-on-LAN (WOL) packet to the client computer (block 504). The packet includes instructions to the client computer to pre-boot from an alternate OS, if present, in the client computer, rather than the client computer's primary OS. (If an alternate OS is not present, then the client computer receives the fix as described in FIG. 4a.) This pre-boot operation identifies what anti-virus action is required (block 506) according to the anti-virus sent in the packet from the fix server.

The pre-boot configures the pre-boot NIC driver to communicate only with the fix server (block 508). The secondary OS's pre-boot fetches the anti-virus from the fix server, and stages fixes an installs changes (e.g., new drivers, flags, settings, etc.) in the primary OS (block 510). That is, the pre-boot of the secondary OS repairs, the primary OS while the primary OS is inactive. The pre-boot of the secondary OS then reboots the primary OS (block 512), and the primary OS completes available changes (new drivers, flags, settings, etc.) according to the anti-virus instructions (block 514). The primary OS then fully boots up the client computer, including setting the NIC driver to allow unfettered communication with any computer on the network (blocks 516 and 518).

FIG. 5b describes a similar procedure as shown in FIG. 5a, except that the computer is initially turned on (blocks 522 and 524). Upon receipt of an anti-virus packet received from the fix server, the client computer's agent informs a user of the client computer that a re-boot is imminent (block 526), allowing the user to shut down the computer, or else be aware that the client computer will automatically shut down (after saving data, settings, etc.). The client computer's agent program then reboots to the pre-boot of the secondary OS (block 528). The pre-boot receives the anti-virus and identifies what action is required by the anti-viral instructions (block 530).

The pre-boot configures the secondary OS to isolate the client computer from the network by resetting the NIC drivers in a manner that only the fix server can be contacted (block 532). The NIC the fetches the anti-virus from the fix server, and makes appropriates staging and changes installation in the primary OS (block 534). The pre-boot of the secondary OS then reboots in the primary OS (block 536), the primary OS installs requisite changes, if necessary, according to the downloaded anti-virus (block 538), and the agent then puts the client computer back on the full network by re-setting the NIC drivers (blocks 540 and 542).

Figure 6A:
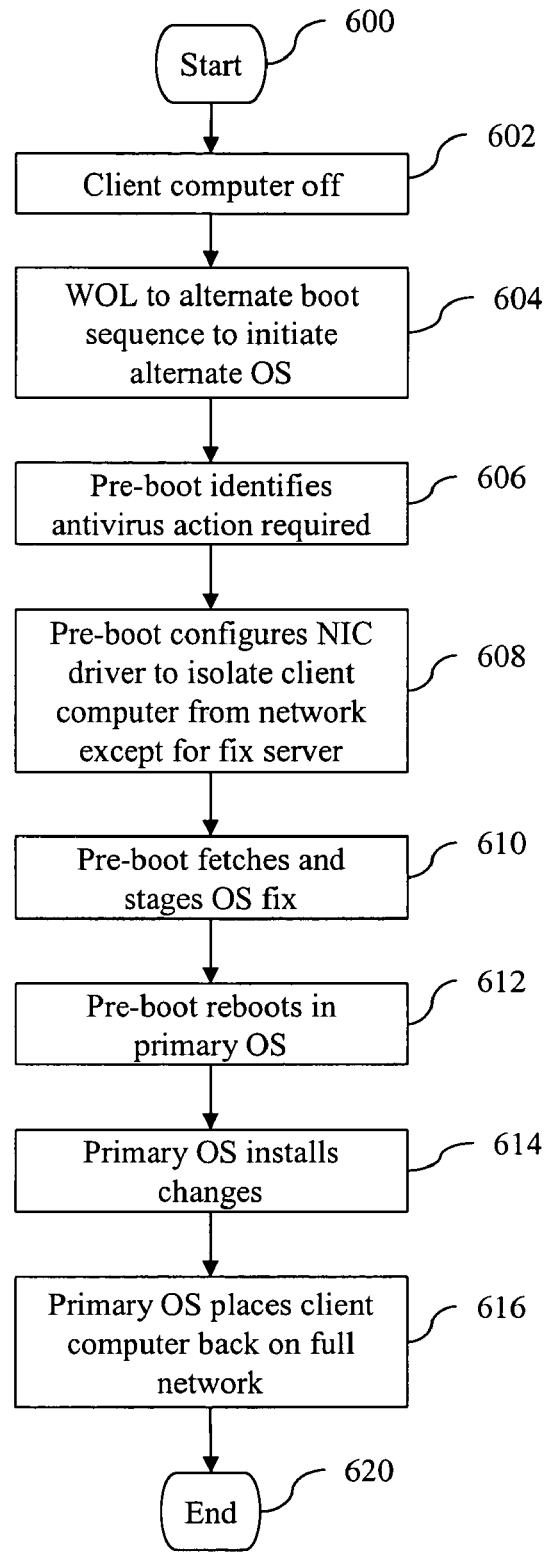
FIG. 6a is a flow-chart of steps taken to download the anti-virus using a hardware Service Processor (SP) to reconfigure the NIC driver when the client computer is initially turned off.

The two methods above have a limitation that there may be occasions in which the primary and secondary OS are both corrupted by the virus. Such a situation is addressed by the process described in FIGS. 6a-b. Referring now to FIG. 6a, assume that the client computer is initially turned off (blocks 600 and 602). The fix server sends a packet including a fix (anti-virus) as well as WOL signal to the client computer. A service processor (SP) in the client computer, described above in FIG. 2, queries software and memory in client computer 102 to see if the client computer has already installed the sent anti-virus (block 604). If not (query block 606), completely isolates the client computer from the network (block 608). The SP then boots the pre-boot of the primary OS with instructions pre-stored in the SP (block 610), and identifies antiviral actions required by the instructions (block 612).

The SP then resets the NIC drivers to communicate only with the fix server (block 614). That is, the SP performs the NIC driver setting operation that was performed by the OS's described in FIGS. 4 and 5, but with the use of hardware only, which is impervious to viruses since it is isolated from viral attack. The pre-boot fetches and stages the anti-viral fixes (block 616), and reboots the primary OS (block 618). The primary OS installs the changes causes by the anti-virus (block 620), and the client computer is put back on full line on the network by the SP (blocks 622 and 624).

Figure 6B:
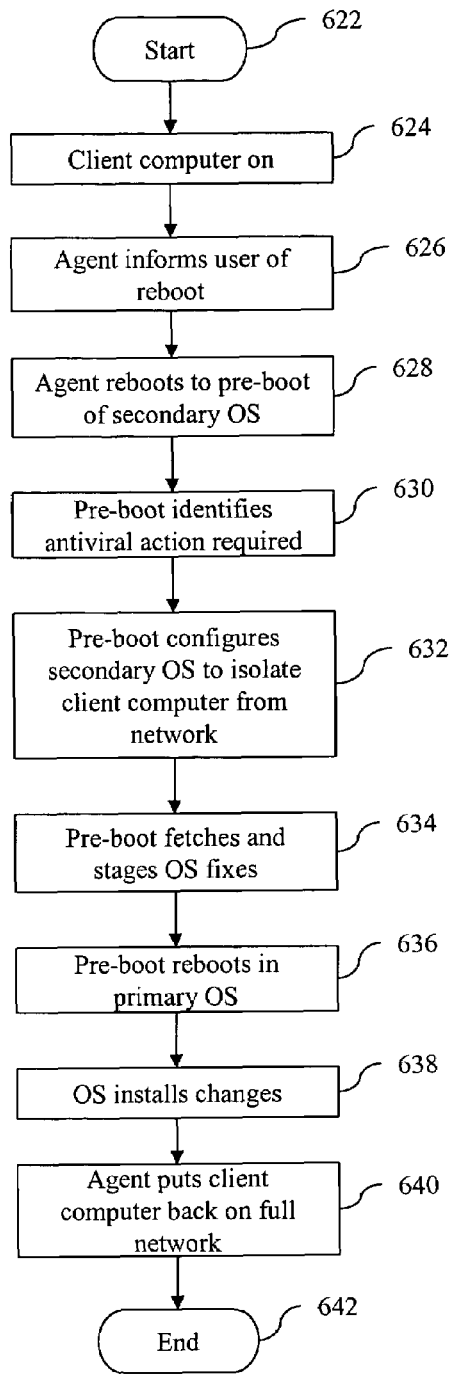

FIG. 6b addresses a similar condition as addressed in FIG. 6a, but the client computer is initially running (blocks 626 and 628). If the agent in the client computer determines that the anti-virus being offered by the fix server has not been previously downloaded (query block 630), then the agent informs the user of the client computer that a forced re-boot is imminent (block 632). The SP totally isolates the client computer from the network by disabling the NIC (block 634), and the SP reboots to pre-boot in the primary (or alternately in the secondary) OS.

The pre-boot in the OS identifies what antiviral action is required (block 638), and then configures the NIC drivers to communicate only with the fix server (block 640). The pre-boot fetches and stages the anti-virus (block 642), and then re-boots in the primary OS (block 644). The primary OS installs the changes causes by the anti-virus (block 646), and the SP puts the client computer back on the full network (blocks 646 and 650).

In a preferred embodiment, client computer 102 monitors, using any known system monitoring software and/or hardware, whether client computer 102 can configure the NIC 240 as described above using a primary OS, a secondary OS, or a Service Processor, such as SP 214. That is, if the client computer 102 has an SP 214, then the first choice is to use SP 214 to configure NIC 240 in a manner described in FIGS. 6a-b. If client computer 214 does not have an SP 214, then the NIC 240 is configured using a secondary (alternate) OS, as described in FIGS. 5a-b. Finally, if the client computer 214 does not have an alternate OS, then the NIC 240 is configured as described in FIGS. 4a-b.

An embodiment of the invention with an even higher level of security can be implemented by utilizing the "virtual machine monitor" and associated "virtual machine" technologies referred to in the background section. This can be implemented by modifying the virtual machine monitor according to the example given below with reference to FIGS. 7a and 7b. These modifications can be applied to currently available virtualization software executed by CPU 202 out of memory 212, such as the ESX Server software product by VMware Corp.

Additionally, for a higher level of security, support for virtualization can be built into any or all of CPU 202, North Bridge 206, and Memory Controller 207. For example, any of these components can be modified to physically block inter-memory access for different virtual machines, contain redundant hardware for virtualization purposes, and provide specialized access including encrypted access to hardware resources. Moreover, it is well known in the art that software components can be readily implemented as hardware and visa-versa. Accordingly, alternative embodiments can include portions of the virtual machine manager itself, which can be implemented in any or all of CPU 202, North Bridge 206, and Memory Controller 207.

Virtual machines and virtual machine monitors address the need to run applications written for different operating systems concurrently on a common hardware platform, or for the full utilization of available hardware resources. A Virtual Machine Monitor (VMM), sometimes referred to in the literature as a "hypervisor," is a thin piece of software that runs directly on top of the hardware and virtualizes all the hardware resources of the machine. Since the virtual machine monitor's interface is the same as the hardware interface of the machine, an operating system cannot determine the presence of the VMM. Consequently, when the hardware interface is one-for-one compatible with the underlying hardware, the same operating system can run either on top of the virtual machine monitor or on top of the raw hardware. It is then possible to run multiple instances of operating systems or merely instances of operating system kernels if only a small subset of system resources are needed. Each instance is referred to as a virtual machine. The operating system can be replicated across virtual machines or distinctively different operating systems can be used for each virtual machine. In any case, the virtual machines are entirely autonomous and depend on the virtual machine monitor for access to the hardware resources such as hardware interrupts.

Figure 7A:
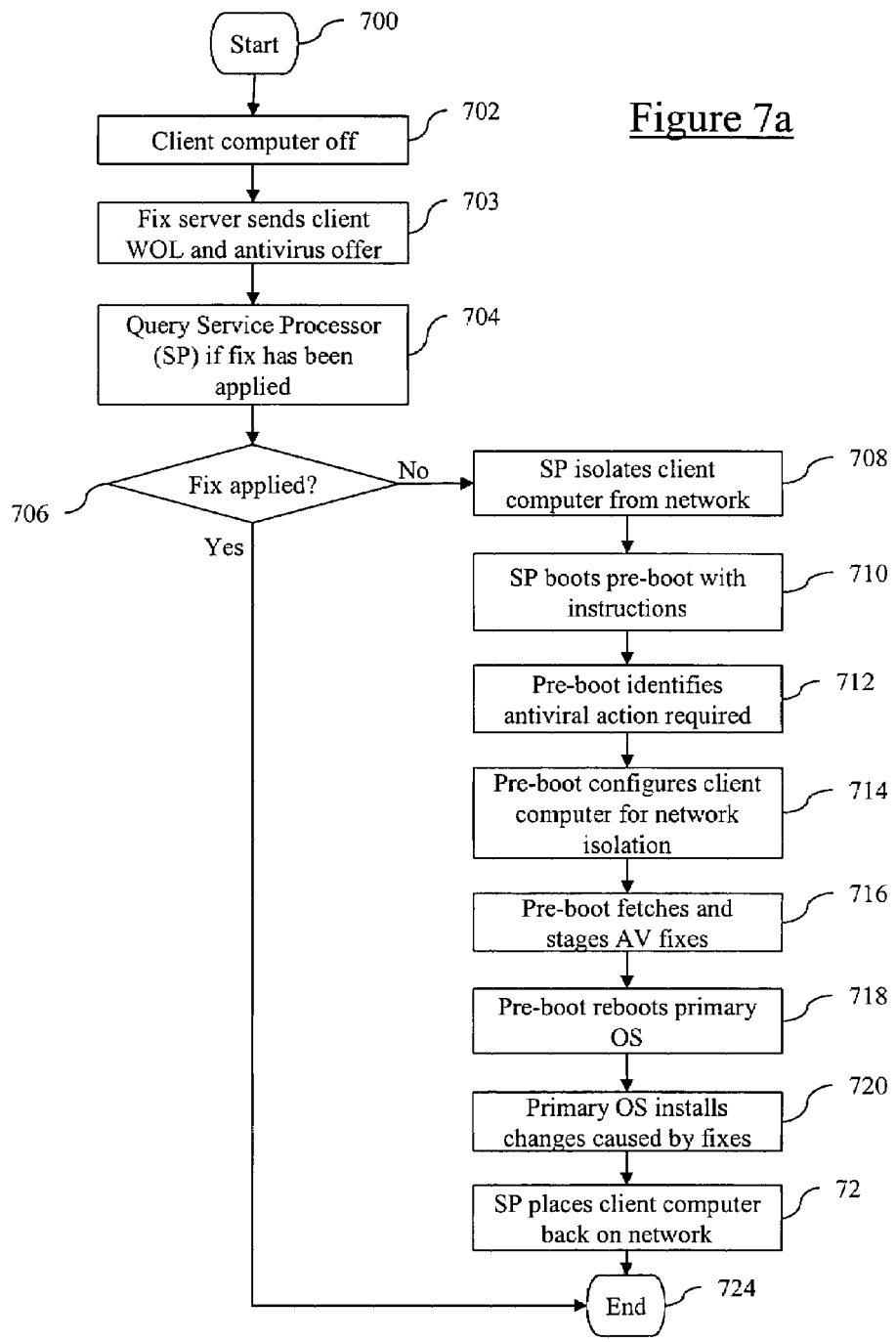
FIG. 7a is a flow-chart of steps taken to download the anti-virus using a virtual machine (VM) and virtual machine monitor (VMM) to reconfigure the NIC driver when the client computer is initially turned off.

Referring now to FIG. 7a and assuming that the client computer is initially turned off (blocks 700 and 702). The fix server sends a packet including a fix (anti-virus) as well as WOL signal to the client computer. A virtual machine monitor (VMM), rather than the SP 214 of FIG. 2, can perform the functions described relative to agent 238 in the client computer to query software and memory in client computer 102 to see if the client computer has already installed the sent anti-virus (block 704). If not (query block 706), the VMM then resets the NIC drivers to communicate only with the fix server and otherwise completely isolates the client computer from the network (block 708). That is, the VMM performs the NIC driver setting operation that was performed by the OS's described in FIGS. 4 and 5, but with the use of the VMM and the main processor, both of which are impervious to viruses since they are isolated from viral attack. Moreover, any of the known methods of network isolation (block 708) can be used including application of a filter or mask to any level of communication code ranging from the driver level all the way to the UDP or TCP/IP level or higher.

The VMM then initiates a virtual machine (VM) with instructions pre-stored in the VMM (block 710), and identifies antiviral actions required by the instructions (block 712). As an alternative to initiating a VM, the VMM can perpetually maintain an active VM just for this purpose and transfer control to the VM when corrective action is required. If the fixes are installable by the VM (or alternately the VMM) directly (decision block 714), the VM fetches and directly installs the anti-viral fixes (block 715), and the client computer is put back on full line on the network by the VMM (blocks 722 and 724). Otherwise, the VM fetches and stages the anti-viral fixes (block 716), and reboots the primary OS (block 718). The primary OS installs the changes causes by the anti-virus (block 720), and the client computer is put back on full line on the network by the VMM (blocks 722 and 724).

FIG. 7b addresses a similar condition as addressed in FIG. 7a, but the client computer is initially running (blocks 726 and 728). If the VMM determines that the anti-virus being offered by the fix server has not been previously downloaded (query block 730), then the VMM informs the user of the client computer that a forced re-boot is imminent (block 732). The VMM then resets the NIC drivers to communicate only with the fix server and otherwise completely isolates the client computer from the network (block 734), and the VMM invokes a VM or transfers control to a perpetual VM as described above.

The VM identifies what antiviral action is required (block 738). If the fixes are directly installable by the VM (or the VMM) (decision block 740), the VM fetches and directly installs the anti-viral fixes (block 741), and the client computer is put back on full line on the network by the VMM (blocks 748 and 750). Otherwise, the VM fetches and stages the anti-virus (block 742), and then re-boots in the primary OS (block 744). The primary OS installs the changes caused by the anti-virus (block 746), and the VMM puts the client computer back on the full network (blocks 748 and 750).

Figure 8:
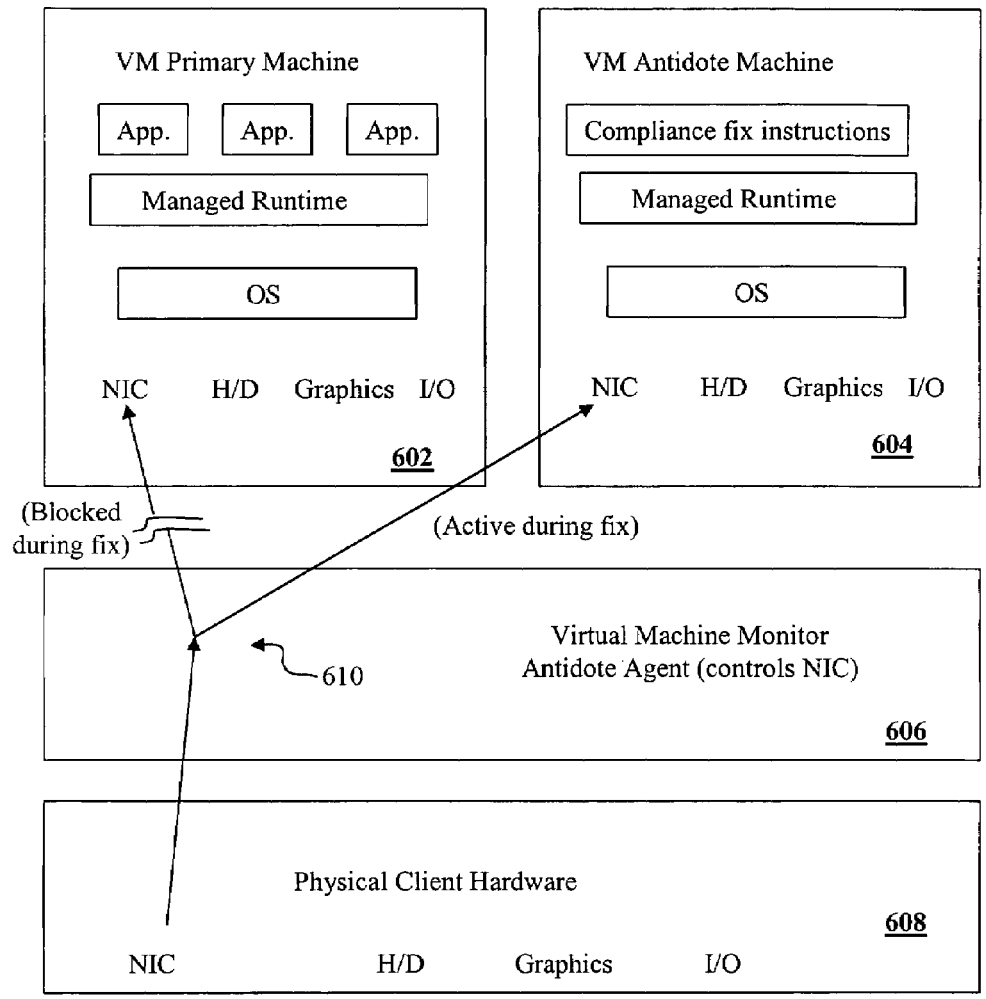
FIG. 8 is a system virtualization layer diagram showing the abstraction layers in a client running virtualization software which includes a virtual machine monitor.

FIG. 8 is a system virtualization layer diagram showing the abstraction layers in a client running virtualization software which includes a virtual machine monitor. At the lowest level of abstraction is the hardware layer 808; this is the physical hardware layer of the client machine. A Virtual Machine Monitor layer 806 is an intermediary layer which sits on top of the hardware layer 808 and intercepts all access attempts to the physical hardware by software running on the client machine. It is within the Virtual Machine Monitor layer 806 that the Antidote Agent 238 runs and is executed as part of the virtual machine monitor and as such has all the security and isolation features of the virtual machine monitor. At the highest level of abstraction lie the virtual machines 802 and 804 which ultimately run operating systems and software applications. Virtual machines can be configured so as to know not of the existence of other virtual machines; they can be isolated and autonomous as would be the case for virtual machine 804 which executes the anti-virus instructions provided by and under the control of the Antidote Agent 238 from the Virtual Machine Monitor layer 806. Arrows 810 indicate the isolation of the NIC to virtual machine 802 during a virus fix operation while allowing VM Antidote machine 804 to communicate only with the fix server as described above relative to FIGS. 7*a* and 7*b*.

Using the VM Antidote Machine 804 under the control of the Antidote Agent running as part of the virtual machine monitor in layer 806 allows for the control and monitoring of all communications present in the client computer, including Modem, WAN, WLAN, Serial Port, USB and other ports. This embodiment is both immune from attack and utilizes the primary CPU 202 and the entire client computer for fix/patch management if desired.

In a preferred embodiment, client computer 102 monitors, using any known system monitoring software and/or hardware, whether client computer 102 can configure the NIC 240 as described above using a primary OS, a secondary OS, a Service Processor, such as SP 214, or a virtual machine manager. That is, if the client computer 102 has a virtual machine manager, then the first choice is to use the virtual machine manager to run the Antidote Agent in a manner described in FIGS. 7*a*-8. If client computer has an SP 214, then the second choice is to use SP 214 to configure NIC 240 in a manner described in FIGS. 6*a*-*b*. If client computer 214 does not have an SP 214, then the NIC 240 is configured using a secondary (alternate) OS, as described in FIGS. 5*a*-*b*. Finally, if the client computer 214 does not have an alternate OS, then the NIC 240 is configured as described in FIGS. 4*a*-*b*.

Embodiments of the present invention include various functions, which have been described above with reference to FIGS. 4*a*-8. The functions may be performed by hardware components or may be embodied in machine-executable instructions, which may be used to cause a general-purpose or special-purpose processor programmed with the instructions to perform the functions. Alternatively, the functions may be performed by a combination of hardware and software.

Figure 9:
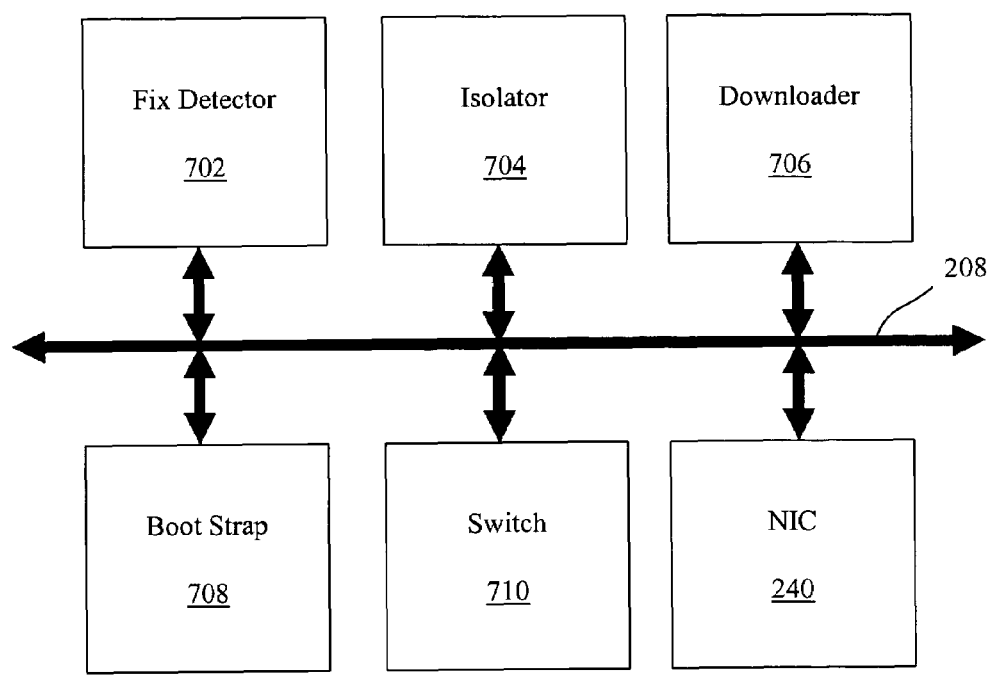
FIG. 9 is a block diagram of an embodiment in which various functions of FIGS. 4a-8 are performed in hardware.

FIG. 9 is a block diagram of an embodiment in which various functions of FIGS. 4*a*-8 are performed in hardware, and in particular, in the hardware associated with client computer 102 depicted in FIGS. 1-2. Fix detector 902, Isolator 904, Downloader 906, Boot Strap 908, Switch 910, and NIC 240 of FIG. 2 are all coupled to the high speed interconnect (PCI) bus 208. Fix detector 902 discerns an offer for a software fix from a fix server as described with respect to any of the previously described embodiments. Isolator 904 is responsible for controlling and isolating NIC 240 such that communication can only occur with the fix server upon a receipt of the offered software fix. Isolator 904 can perform the isolation function according to any of the embodiments previously described. Downloader 906 functions to effect the transfer of the software fix from the fix server to the client computer according to any of the above described embodiments. Boot strap 908 reboots the client computer according to any previous embodiment after the software fix has been downloaded and executed. Isolator 904 reconnects the client computer to the network without restrictions after the software fix is loaded and executed. Switch 910 selects the best method according to availability of a primary OS, a secondary OS, a Service Processor, such as SP 214, or a virtual machine manager as described above.

Figure 10:
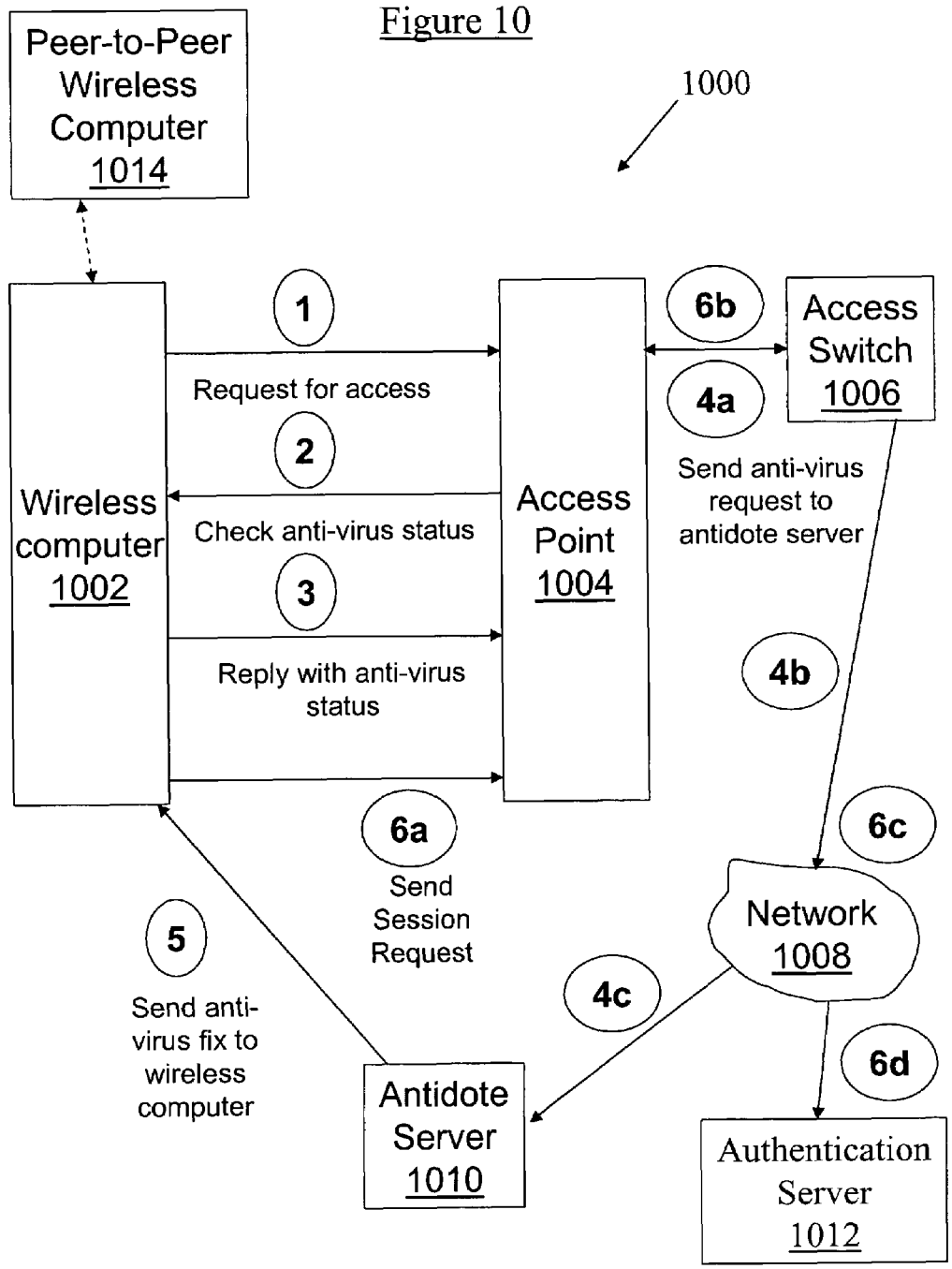
FIG. 10 is a diagram of a Wireless Local Area Network (WLAN) in which the present invention is utilized.

With reference now to FIG. 10, a diagram of an exemplary Wireless Local Area Network (LAN) 1000 used by the present invention is depicted. Also depicted in FIG. 10 are numbered steps taken to permit a wireless computer 1002 to be accorded a full session with a network 1008. As indicated by Step 1, a request for access to network 1008 is sent from the wireless computer 1002 to an access point 1004, which is a wireless transceiver capable of communicating with and coupling wireless computers to a Wireless Local Area Network (WLAN). The access point 1004 then returns (Step 2) a message that checks on the anti-virus status of the wireless computer 1002. This checking message requests the wireless computer to send a status message indicating, preferably through the use of flags or other indicators, which anti-virus programs have been run in the wireless computer 1002, including the version and date run. In Step 3, the wireless computer 1002 replies by sending this status message to the access point 1004.

The access point 1004 has a list of requisite anti-viral programs that must be run by a wireless computer before that wireless computer is allowed to have a full session (unlimited access to) with network 1008. If the status message indicates to the access point 1004 that not all of the requisite anti-viral programs have been run, then the access point sends an anti-virus request to an antidote server 1010. This request, as indicated by Steps 4*a*-*c*, is sent through an access switch 1006 and the network 1008 to the antidote server 1010. In Step 5, the antidote server 1010 sends the necessary anti-viral program(s) and/or anti-virus fix (program portion) to the wireless computer 1002.

Next, as indicated in Steps 6*a*, the wireless computer 1002 initiates a full session with the access point 1004, assuming that Steps 1-3 have been re-run and the access point 1004 has determined that all requisite anti-viral programs have been executed in the wireless computer 1002. As shown in Steps 6b-d, the session request is sent to an authentication server 1012, which derives with wireless computer 1002 a key that is necessary for the wireless computer 1002 and access point 1004 to establish a full session, according to authentication protocols used by access point 1004. These authentication protocols include, but are not limited to 801.1x, Extensible Authentication Protocol (EAP), and Cisco's® Wireless authentication protocol LEAP. Details of the protocol for 801.1x are found in IEEE's Network Working Group's RFC 3580, "RFC 3580—IEEE 802.1X Remote Authentication Dial In User Service (RADIUS) Usage Guidelines," which is herein incorporated by reference in its entirety. Details of the protocol for EAP are found in IEEE's Network Working Group's RFC 2284, "RFC2284—PPP Extensible Authentication Protocol (EAP), which is herein incorporated by reference in its entirety. Details of the protocol for LEAP are found in the white paper titled "Cisco SAFE: Wireless LAN Security in Depth," authored by Convery et al. and published by Cisco Systems, Inc., and herein incorporated by reference in its entirety.

Figure 11:
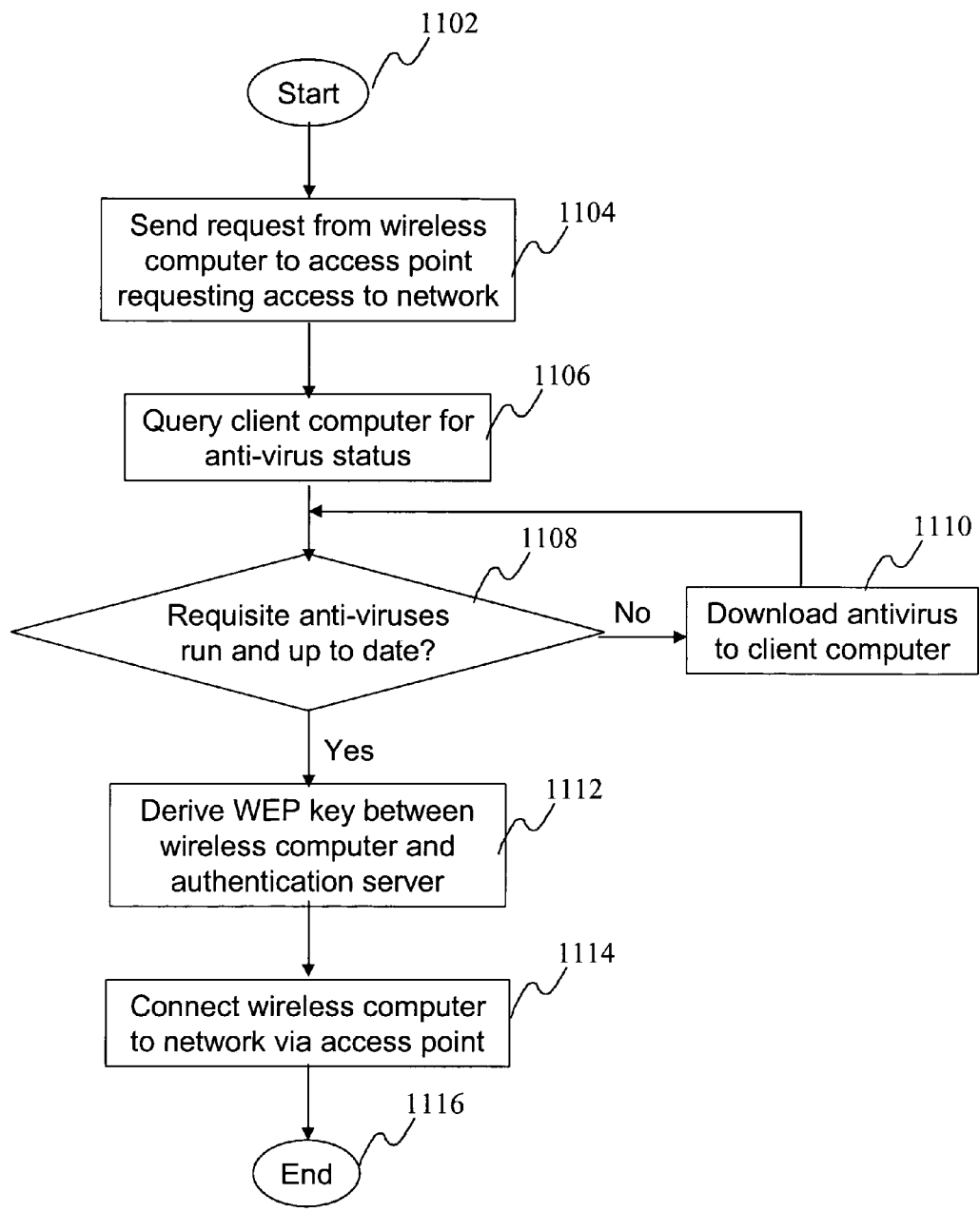
FIG. 11 is a flow-chart of steps taken to connect a wireless client computer to the WLAN only after confirming that the wireless client computer has run all requisite anti-virus programs.

Referring now to FIG. 11, a flow-chart of steps shown in FIG. 10 is given. After initiator block 1102, a request is sent from the wireless computer to the access point requesting a session (block 1104). The access point, which preferably contains a listing of the requisite anti-viral programs that must be run before a session is allowed, queries the wireless computer to determine if the requisite anti-viral programs have been run (block 1106). If the requisite anti-viral programs have not been run (query block 1108), then the necessary anti-viral programs or anti-virus fixes are downloaded from the antidote server to the wireless computer (block 1110). Otherwise, a Wired Equivalent Privacy (WEP) key, as required by EAP, is derived between the wireless computer and the authentication server (block 1112), and the wireless computer initiates a full access session with the access point and connected network (block 1114), thus ending the process (terminator block 1116).

Figure 12:
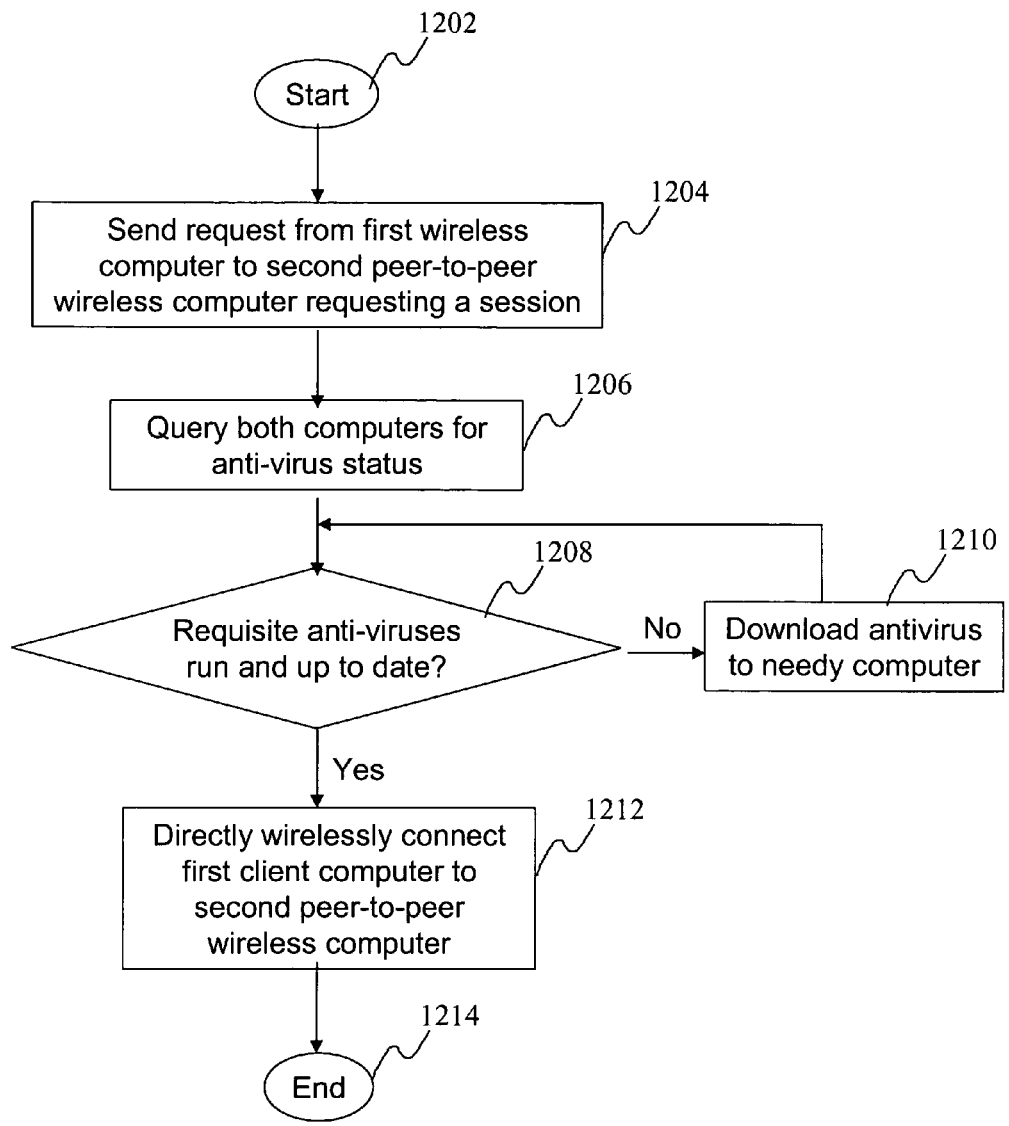
FIG. 12 is a flow-chart of steps taken to connect a first wireless client computer to a second peer-to-peer client computer only after confirming that both wireless client computers have run all requisite anti-virus programs.

As suggested by the dashed line in FIG. 10, the wireless computer 1002 may also establish a communication session directly with another wireless computer (shown as peer-to-peer wireless computer 1014) using a peer-to-peer session, thus avoiding access point 1004. Care must be taken to ensure that such sessions do not result in one wireless computer infecting another wireless computer. To address this concern, reference is now made to the steps depicted in FIG. 12.

After initiator block 1202, a request is sent from a first wireless computer to a second peer-to-peer computer requesting a communication session (block 1204). Both computers query each other about their respective anti-virus status (block 1206), as described above between the wireless computer 1002 and the access point 1004. If either wireless computer has not run the requisite anti-viral programs (query block 1208), then the necessary anti-viral programs and/or fixes are downloaded from the antidote server to the wireless computer needing the update (block 1210). Otherwise, the two wireless computers are directly wirelessly coupled in an ad hoc (peer-to-peer) format (block 1212), and the process ends (terminator block 1214). Note that in such a peer-to-peer scheme, at least one of the wireless computers must know which anti-viral programs are required. Thus, in a preferred embodiment, one of the wireless computers must first establish a session with the access point, in a manner described above, before establishing a peer-to-peer connection.

An embodiment of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media \ machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

The present invention has been described in relation to particular embodiments that are intended in all respects to be illustrative rather than restrictive. For example, while the present invention has been described as connecting a wireless computer to a WLAN, the present invention may be utilized in any analogous system in which client computers are likewise intermittently connected to a network. Alternative embodiments will become apparent to those skilled in the art to which the present invention pertains without departing from its spirit and scope. Accordingly, the scope of the present invention is defined by the appended claims rather than the foregoing discussion.

What is claimed is:

1. A method comprising:
   sending a request for a peer-to-peer communication session directly from a first wireless computer to a second wireless computer;
   transmitting a status check from the first wireless computer to the second wireless computer to determine an anti-virus status on the second wireless computer, wherein the anti-virus status is determined by an execution of all requisite anti-virus programs;
   transmitting a status check from the second wireless computer to the first wireless computer to determine the anti-virus status on the first wireless computer; and
   establishing the peer-to-peer communication session between the first and second wireless computers only if both wireless computers have executed all of the requisite anti-virus programs.

2. The method of claim 1, further comprising:
   in response to both wireless computers not having executed all of the requisite anti-virus programs, downloading an antidote fix from an antidote server to each wireless computer that has not executed all of the requisite anti-virus programs, wherein the antidote fix contains all software needed by the wireless computers to complete an execution of all of the requisite anti-virus programs.

* * * * *